DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 3, 1976

949 O.G. 9

T949,005

COATING SOLUTIONS

Charles H. Coney, 2008 Canterbury Road 37660, and Glenna E. Burnett, 1701 Dennis Bypass 37664, both of Kingsport, Tenn.

Continuation of application Ser. No. 459,242, Apr. 8, 1974, which is a continuation of application Ser. No. 333,243, Feb. 16, 1973, which in turn is a division of application Ser. No. 113,596, Feb. 8, 1971, all now abandoned. This application May 27, 1975, Ser. No. 580,639

Int. Cl.[2] B32B *21/06, 21/14, 29/00*

U.S. Cl. 428—535

No Drawing. 15 Pages Specification

A coating solution is disclosed which comprises cellulose propionate and a solvent therefor. The cellulose propionate contains, by weight, at least about 35% propionyl, between about 4.4% and about 12% hydroxyl, and no greater than about 4.5% acetyl, and has a viscosity of between about 0.02 to 20 seconds. The preferred solvent is a blend of lower alkanol and water. The solution is especially useful as a coating for paper, to render it glossy, scuff resistant, water resistant, and does not hinder its repulpability.